United States Patent [19]

Dagenais et al.

[11] Patent Number: 5,022,741
[45] Date of Patent: Jun. 11, 1991

[54] OPTICAL BISTABLE DEVICES BASED ON BOUND EXCITON NONLINEARITY

[75] Inventors: Mario Dagenais, Wellesley; Wayne F. Sharfin, Lexington, both of Mass.

[73] Assignee: GTE Laboratories Incorporated, Waltham, Mass.

[21] Appl. No.: 796,834

[22] Filed: Nov. 12, 1985

[51] Int. Cl.$^5$ .............. G02F 1/01; G02B 5/23
[52] U.S. Cl. ................ 350/353; 350/354; 372/8; 372/21
[58] Field of Search ............ 350/354, 353; 372/8, 372/23, 21

[56] References Cited

U.S. PATENT DOCUMENTS

| 3,610,731 | 10/1971 | Seidel | 350/160 |
| 4,468,772 | 8/1984 | Oudar | 372/8 |
| 4,630,898 | 12/1986 | Jewell | 350/354 |

OTHER PUBLICATIONS

Smith et al., "Bistable Optical Devices Promise Sub-picosecond Switching", IEEE Spectrum, Jun. 1981, pp. 26-33.
Anon, "All-Optical GaAs Chip: Bistable at Room Temperature", Electro-Optical Systems Design, May 1982, p. 12.
Peyghambarian et al., "Optical Nonlinearity and Bistability Due to the Bioexciton Two-Photon Resonance in CuCl", Optical Bistability 2, 1984 (from Optical Bistablity, Jun. 15-17, 1983), pp. 259-266.
Pagenais et al., "Carityless Optical Bistability Due to Light-Induced Absorption in Cadmium Sulfide", Appl. Phys. Lott. 45(3), Aug. 1, 1984, pp. 210-212.
Bohnert et al, "Plasma Induced Optical Nonlinearities and Optical Bistabilition CdS", Z. Phys. B-Condensed Matter 57, No. 4, pp. 263-272, Dec. 1984.
Gibbs et al., "Room Temperature Excitonic Optical Bistability in GaAs-GaAlAs Superlattice Etalon", Appl. Phys. Lett., vol. 41(3), Aug. 1, 1982.

Primary Examiner—Eugene R. Laroche
Assistant Examiner—Michael Shingleton
Attorney, Agent, or Firm—Victor F. Lohmann, III; James J. Cannon, Jr.

[57] ABSTRACT

The $I_2$ bound exciton in cadmium sulfide (bound to a neutral donor) is a very efficient radiator, providing low switching energy and fast switching times for an ON and OFF optical bistable device, desirable for all-optical signal processing applications. The optical bistable device for light at a given wavelength includes a Fabry-Perot cavity having a pair of opposed mirrored surfaces. A direct bandgap semiconductor, such as CuCl, CdSe, CdS, and GaAs having a bound exciton, is located within the cavity. The cavity is tuned near resonance of the light. The bound exciton has a coefficient of absorption tuned near resonance. A light beam of varying intensity is applied from without the cavity to one of the surfaces. The semiconductor has both an index of refraction and a coefficient of absorption that vary with the magnitude of applied light. Thus, light applied thereto passes through the device either substantially unimpeded or impeded, dependent upon its magnitude.

4 Claims, 2 Drawing Sheets

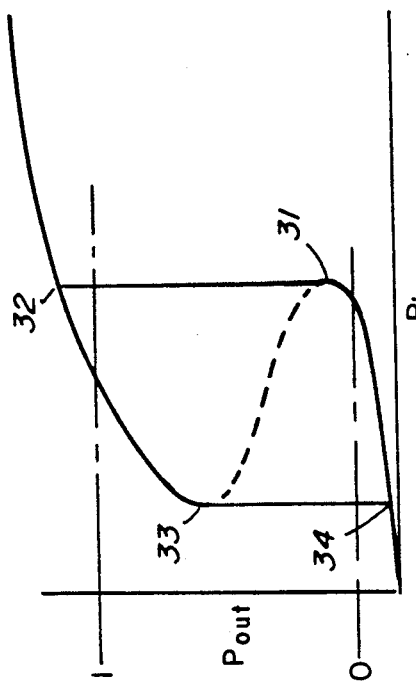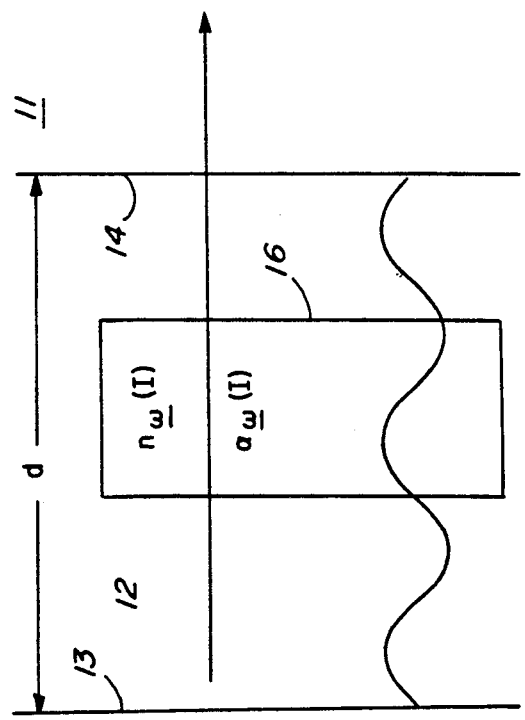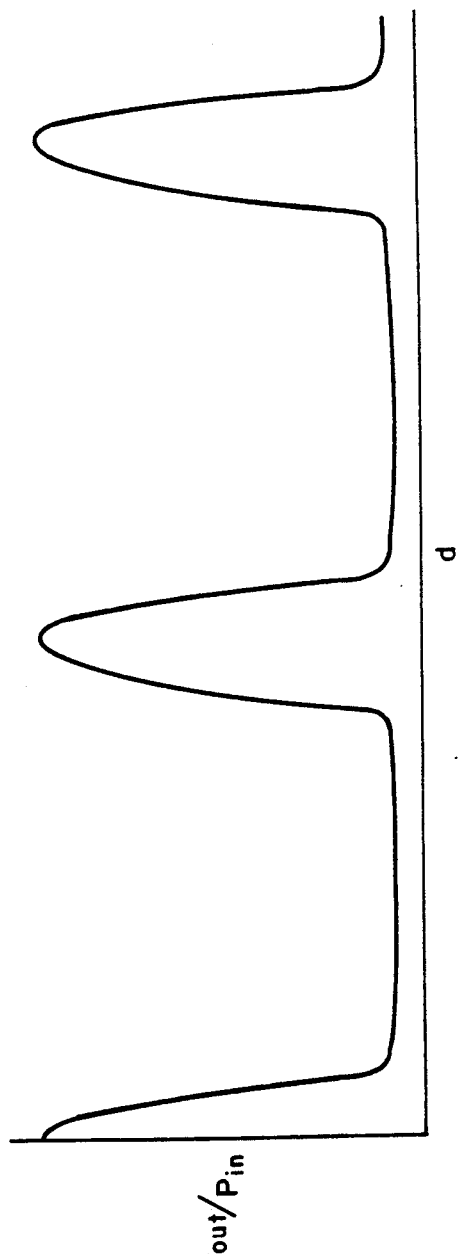
FIG. 3
FIG. 1
FIG. 2

OPTICAL BISTABLE DEVICES BASED ON BOUND EXCITON NONLINEARITY

The Government has rights in this invention pursuant to Contract No. F49620-84-C-0052 awarded by the Department of the Air Force.

BACKGROUND OF THE INVENTION

1. Field of the Invention

This invention relates to optical bistable devices and, in particular, to fast and low power optical bistable devices using bound excitons. Accordingly, it is a general object of this invention to provide new and improved devices of such character.

2. General Background

Optical bistability in a device comprising a thin cadmium sulfide platelet has been set forth in co-pending U.S Pat. application Ser. No. 6-713,510, entitled "Optical Bistable Devices", filed Mar. 19, 1985, by the applicants of this specification. That application, however, does not relate to optical cavities or to the intrinsic properties of bound excitons.

Also of interest are the following articles:

"Low power transverse optical bistability near bound excitons in cadmium sulfide", M. Dagenais and H. G. Winful, *Appl. Phys. Lett.* 44(6), 15 Mar. 1984, pp. 574-576.

"Cavityless optical bistability due to light-induced absorption in cadmium sulfide", M. Dagenais and W.F. Sharfin, *Appl. Phys. Lett.* 45(3), 1 Aug. 1984, pp. 210-212.

"Giant nonlinearities and low power optical bistability in cadmium sulfide platelets", M. Dagenais, *Phil. Trans. R. Soc. Lond. A.*, 28 June 1984, 4 pages.

The subject matter of the foregoing three publications, although of interest, do not relate to devices in a cavity.

Appearing in the XIII International Quantum Electronics Conference Technical Digest, June 18-21, 1984, Anaheim, Ca., pp. 62-63, is a summary entitled "TuEE4 Low-Power Optical Bistability in Cadmium Sulfide Platelets", M. Dagenais, W. F. Sharfin and H.G. Winful, which reports the observation of transverse and whole beam optical bistability in thin uncoated cadmium sulfide platelets. However, there, the observed whole-beam bistability is thermally induced and it is cavityless.

It has been noted that some of the largest nonlinearities in nature have been observed near the band gap of semiconductors. In a semiconductor, the processes that lead to a nonlinear optical response include the creation of free carriers (free electrons and holes), free excitons (moving Coulomb correlated electron-hole pairs), and biexcitons (free moving excitonic molecules). Many of these processes have already been used to demonstrate optical bistability. In past approaches, free excitons, that is, those that are not bound, have been used to demonstrate optical bistability. Mobile species were created that implied that the switching energy of a bistable device does not necessarily decrease by focusing the incident light more sharply. In the case of the bound excitons, concerning localized nonlinearity, switching energy can be reduced by sharply focusing the light beam, thus providing the possibility of dealing with large two-dimensional arrays (possibly $10^4 \times 10^4$ in a 1 cm$^2$ area) that can be addressed at relatively low power. The foregoing is important for applications in two-dimensional signal processing. In addition to having a localized nonlinearity that decays mostly radiatively and very rapidly, the radiative lifetime of the $I_2$ bound excitons have been measured to be 500 ps. Thus, very fast switching time, in the order of less than 1 ns, is expected in such a system. As the decay is mostly radiative, only a small amount of energy is dissipated nonradiatively as heat, in contrast to the nonlinearities due to mobile species in semiconductors. For these nonlinearities, a large fraction of the absorbed energy is dissipated nonradiatively.

SUMMARY OF THE INVENTION

Another object of this invention is to provide a new and improved optical bistable device utilizing an exciton bound to a neutral donor as a very efficient radiator to demonstrate the lowest known switching energy and also the fastest known switching ON and OFF optical bistable device.

Still another object of this invention is to provide a new and improved optical bistable device having such characteristics that are usable in an all-optical signal processing system.

In accordance with one aspect of the invention, an optical bistable device, for light at a given wavelength, includes a Fabry-Perot cavity having a pair of opposed mirrored surfaces. A direct bandgap semiconductor, such as, for example, CuCl, CdSe, CdS, and GaAs, having a bound exciton is located within the cavity. The cavity is tuned near a transmission resonance of the light that is applied thereto. The absorption frequency of the bound exciton is near the cavity resonance. Means are provided for applying a light beam of varying intensity from outside of the cavity to one of the surfaces. The semiconductor has an index of refraction that varies with the magnitude of light applied thereto. The semiconductor has a coefficient of absorption that varies with the magnitude of light that is applied thereto. Thus, laser light applied to one of the surfaces passes through the device either substantially unimpeded or substantially impeded, dependent upon the magnitude of the applied light.

BRIEF DESCRIPTION OF THE DRAWINGS

Other objects, features, and advantages of this invention, together with its construction and mode of operation, will become more apparent from the following description, when read in conjunction with the accompanying drawings, in which:

FIG. 1 is a schematic diagram illustrating one embodiment of the invention;

FIG. 2 is a diagram illustrating the ratio power-out/power-in as a function of the optical distance between the opposed mirrored surfaces of the device of FIG. 1;

FIG. 3 is a diagram showing the idealized relationship of power-in vs power-out for the device of FIG. 1.

DESCRIPTION OF PREFERRED EMBODIMENTS

Figure 3A:
FIG. 3A is a single shot trace of $P_{out}$ vs. $P_{in}$ recorded with a transient digitizer for a device constructed in accordance with the embodiment shown in FIG. 1.

It is emphasized that bound excitons are used as the source of large nonlinearities that is required to observe bistability in a nonlinear Fabry-Perot configuration.

FIG. 1 depicts, in a schematic diagram, an optical bistable device 11 including a Fabry-Perot cavity 12 having a pair of opposed mirrored surfaces 13, 14. A direct bandgap semiconductor 16 having a bound exciton is located within the cavity 12.

The semiconductor 16 is selected from the group consisting of CuCl, CdSe, CdS and GaAs. Preferably, we desire to utilize high optical quality, low impurity levels ($\approx 1 \times 10^{15}$/cc) cadmium sulfide platelets grown by vapor phase epitaxy. Their thicknesses are about 10–15 microns. The sample is floated strain free in a cavity. This cavity is formed by a 25μm spacer having a hole in its center inserted between two 90% reflecting dielectric mirrors 13, 14. This nonlinear Fabry-Perot 12 is immersed in superfluid helium to ensure good thermal contact with a heat bath. The single mode absorption αL, at the peak of the bound exciton resonance, is about 5. At 2K, the bound exciton resonance is measured to be about 8 GHz (2σ). The homogeneous contribution to the linewidth is about 1.3 GHz and becomes more important at higher temperatures. Fabry-Perot fringes with good contrast $\approx 8$ are observed as the laser frequency is tuned around the bound exciton resonance. In a sample that was constructed, the background absorption (αL) was measured to be less than 0.1. When the incident laser was tuned in very close proximity to the bound exciton resonance ($<0.3$ cm$^{-1}$) optical bistability was observed with input powers of less then 8 mW incident on the nonlinear Fabry-Perot.

The foregoing measurements were obtained utilizing triangular optical pulses of 80 ns rise and fall time at a repetition rate of about 1000 Hz.

Referring, again, to FIG. 1, there is depicted a sinusoidal waveform which represents several waves of laser light that are applied to the device 11. The distance d between the mirrors 13, 14 is varied to tune the cavity 12 so that the device is in resonance with the frequency of the applied light, and so that the reflections of the light back and forth between the mirrors 13, 14 is re-enforced, in laser fashion, thereby transmitting the signal applied to the cavity 12.

As depicted in FIG. 2, as the distance between the mirrored surfaces 13, 14 is varied, the ratio P-out/P-in can be tuned to peak condition by providing the desired distance d for achieving the maximum ratio of power-out to power-in.

Referring to FIG. 3, there is shown an S-shaped curve depicting the relationship power-in vs. power-out for a direct bandgap semiconductor having a bound exciton. The central portion of the S-shaped curve depicted in FIG. 3 as a dashed line is unstable. In practice, the curve for $P_{out}$ vs. $P_{in}$ is more properly shown as a hysteresis curve, as shown in solid outline in FIG. 3. Thus, as the power-in is slowly applied from a completely off position to the lowermost knee 31 (providing a power-out at a very low value illustrated as a logical zero), the power-out switches abruptly to a very large value at the top 32 of the curve to indicate a logical 1. As $P_{in}$ increases, power-out also gradually increases.

As $P_{in}$ is reduced, $P_{out}$ is gradually decreased to a level at an upper knee 33 to where it then abruptly drops to a low level 34, representing the logical zero condition. Thus, as clearly shown in FIG. 3, the device 11 operates as a bistable device.

FIG. 3A is a single shot trace of power-out vs. power-in, recorded with a transient digitizer. It is noted that very sharp discontinuous switching has been observed. Switching up occurs at input powers of less than 8 mW. The deconvolved switch-up and switch-down times were estimated to be less than 1 and 2 ns, respectively. The input pulse can be lengthened by a factor of more than 10 without altering a plot of $P_{out}$ vs. $P_{in}$ in any significant way, thus indicating that thermal effects do not play a significant role in these measurements. A single beam switching energy of less than 8 pJ is determined, which is believed to be the lowest value yet reported in the literature.

Multiple hysteresis loops on a nanosecond time scale have been observed (not shown).

Various advantages and modifications of this invention will become apparent to those ordinary skilled in the art. For example, an important advantage in using bound exciton nonlinearities is that the switching power can be reduced inversely proportional to the focused spot size area, which is not possible for other systems in which carrier or thermal diffusion is utilized. The desired bistable results of this invention are achievable because of the nondiffusive nonlinearity of the material, a large transition dipole moment, and a very spectrally narrow line. As stated earlier, utilizing bound excitons as the source of nonlinearity is not restricted to cadmium sulfide. Thus, semiconductors as CdSe and GaAs, as indicated earlier, can be utilized.

What is claimed is:

1. An optical bistable device for light at a given wavelength, comprising
   a Fabry-Perot cavity having a pair of opposed mirrored surfaces;
   direct bandgap semiconductor, having a bound exciton, located within said cavity;
   said light being tuned near resonance of said cavity, and
   said bound exciton having an absorption frequency near said cavity resonance; and
   means for applying a light beam of varying intensity from without said cavity to one of said surfaces,
   said semiconductor having an index of refraction that varies with the magnitude of light applied thereto, and
   said semiconductor having a coefficient of absorption that varies with the magnitude of light applied thereto, whereby
   light applied to said one of said surfaces passes through said device either substantially unimpeded or substantially impeded, dependent upon the magnitude of the applied light.

2. The device as recited in claim 1 wherein said cavity is a resonant cavity which is frequency tuned near bound exciton absorption.

3. The device as recited in claim 1 wherein said semiconductor is selected from the group consisting of CuCl, CdSe, CdS, and GaAs.

4. The device as recited in claim 1 wherein said semiconductor is CdS.

* * * * *